United States Patent
Youngs

[11] 3,774,314
[45] Nov. 27, 1973

[54] BALL INCLINOMETER
[76] Inventor: Homer S. Youngs, 8718 Dunaway Dr., San Diego, Calif.
[22] Filed: June 3, 1971
[21] Appl. No.: 149,521

[52] U.S. Cl. ............................ 33/348, 33/365
[51] Int. Cl. ...................... G01c 9/10, G01c 9/32
[58] Field of Search ............... 33/365, 206, 314, 33/348; 240/6.44

[56] References Cited
UNITED STATES PATENTS
2,831,266  4/1958  Dorn et al. ............... 33/365
2,551,338  1/1951  Rogers ..................... 33/370
1,970,543  8/1934  Carbonara ................. 240/6.44

FOREIGN PATENTS OR APPLICATIONS
779,610  7/1957  Great Britain ............... 33/206 R Primary Examiner—Louis R. Prince
Assistant Examiner—Charles E. Phillips
Attorney—Lyon & Lyon

[57] ABSTRACT

An inclinometer in which a ball is movable in a curved tube or between plates forming concentric spherical zones, the ball as well as the tube or plates being transparent and form part of an optical system wherein a position indicating image, resulting in the passing of light through the ball, is produced on a viewing surface.

15 Claims, 12 Drawing Figures

Patented Nov. 27, 1973 3,774,314

INVENTOR.
HOMER S. YOUNGS
BY
Lyon and Lyon
ATTORNEYS 3,774,314

BALL INCLINOMETER

BACKGROUND OF THE INVENTION

Inclinometers or level indicators have heretofor utilized weights suspended from a low friction pivotal support, or have utilized a bubble of gas in an otherwise liquid filled capsule having an arcuate or spherical zone. The suspended weight or pendulum inclinometer is not suitable under conditions of high vibration or extreme and rapid changes in inclination, such as may occur on vehicles, particularly aircraft. The bubble type inclinometer provides only approximate indication and must be viewed from above, unless the image of the bubble is reflected for viewing from a horizontal direction. Also, because of the low mass of the bubble, the problems due low mass and sudden change greatly limit the use of a bubble type inclinometer. In order to minimize or dampen the effect of excessive movement, an opaque ball has been used in place of a bubble; however, the relatively large size of the ball limits the accuracy of reading the ball level.

SUMMARY OF THE INVENTION

The present invention is directed to improved inclinometer and is summarized in the following objects:

First, to provide an inclinometer or turn and bank indicator which utilizes a novel gravity sensing or centrifugal force sensing ball within a curved capsule, arranged to form a part of an optical system wherein an image is produced, capable of indicating accurately the position of the sensing ball.

Second, to provide an inclinometer in which the gravity sensing ball and a liquid filled capsule receiving the ball have combined optical properties that produce a bright, essentially diamond shaped image with attenuated opposed apices, on an appropriate surface to indicate the position of the ball with high accuracy; or, a bright, circular image of sufficiently small diameter is produced so that the position of the ball may be accurately determined.

Third, to provide an inclinometer, as indicated in the preceding object, wherein the gravity sensing ball may be encased in an arcuate capsule or between concentric plates of spherical contour, in either case, the image being, if desired, viewable from any desired direction by appro-priate mirrors.

Fourth, to provide an inclinometer, as indicated in the other objects, wherein the density of the damping liquid may be greater than the density of most particles which may be present therein so that the particles remain suspended and do not interfere with operation of the inclinometer.

Figure 1:
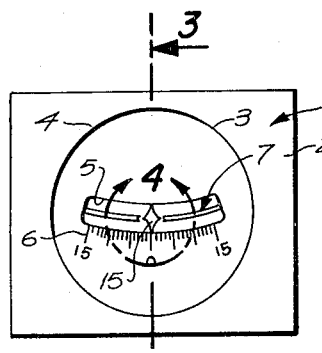
FIG. 1 is a front view of the ball inclinometer, showing the front face thereof.
Figure 2:
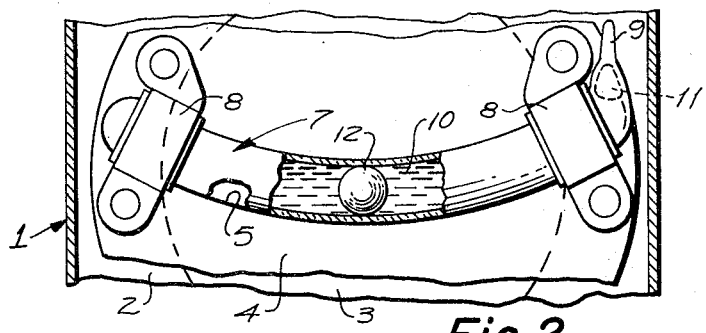
FIG. 2 is an enlarged fragmentary sectional view, taken from 2—2 of FIG. 3, directed toward the back side of the face of the inclinometer.
Figure 4:
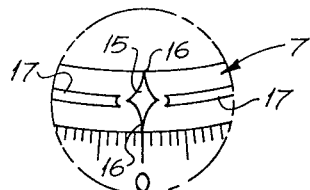
FIG. 4 is an enlarged fragmentary front view of the inclinometer, taken within Circle 4 of FIG. 1, showing a reference or indicator image in the form of an attenuated diamond.
Figure 3:
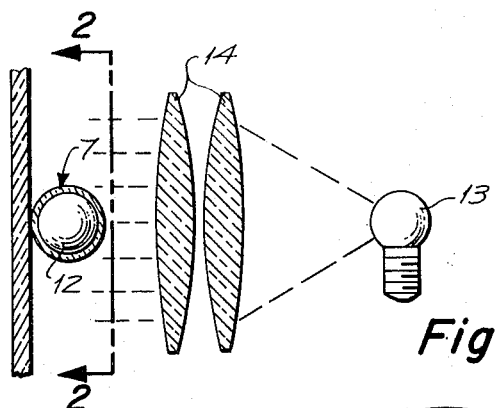
FIG. 3 is a sectional view, taken through 3—3 of FIG. 1, but in schematic form, illustrating the optical components of the inclinometer.

Reference is first directed to FIGS. 1 through 4. The inclinometer is contained within a housing 1, having a front wall 2 in which is provided a circular opening to receive a window or viewing plate 3. The viewing plate is covered with a mask 4, having an arcuate slot 5 and an appropriate scale 6. The exposed portion, at least of the viewing plate 3, forms a translucent surface or is coated with a translucent material to serve as a plane upon which an image may be projected from the rear and seen from the front.

Immediately behind the viewing plate is an arcuate capsule 7 of circular cross section, secured in place by a pair of retaining clamps 8. The capsule is preferably formed of glass and is provided at one end with an upwardly extending sealing tip 9. The capsule is filled with a damping liquid 10, having suitable optical properties. In filling the capsule, a small bubble 11 may remain, which, within the operating range of the inclinometer, remains in the sealing tip 9.

The capsule 7 contains a gravity sensing roller 12, preferably in the form of an optically accurate spherical ball, formed of transparent material, such as glass, or a jewel crystal, such as sapphire. Behind the capsule 7, that is, on the side opposite from the viewing plate 3, there is provided a light source 13 and appropriate lenses 14, so that essentially parallel rays are directed against the back side of the capsule 7.

Operation of the inclinometer shown in FIGS. 1 through 4 is as follows:

The ball 12 is dimensioned with respect to the walls of the capsule so as to roll freely and thereby seek the lowest point of the capsule. The rate of movement is determined by the density of the ball and the density and viscosity of the damping liquid 10 as well as the clearance between the ball and the walls of the capsule. The ball itself forms a part of the optical system, which indicates its position. Also, forming part of the optical system, is the damping liquid 10 and the walls of the capsule. By proper choice of the indices of refraction of the ball, the liquid as well as the spacing between the viewing plate 3 and the capsule, an image is produced on the back side of the viewing plate, which may take the form of a diamond or caustic image, indicated by 15. The diamond image has in-creased light intensity and its boundaries are capable of sharp definition.

More particularly, the upper and lower apices of the diamond are attenuated, as indicated by 16, to form indicating points which permit observation of very slight change in the position of the ball, permitting determination of the angular position of the inclinometer with high accuracy, when observed in relation to the scale 6.

In the regions of the capsule, at either side of the ball, the optical effect of the capsule and its liquid is to provide an illuminated band 17 following the median line of the capsule, but terminating short of each side of the diamond. The band 17 does not detract from the diamond; that is, the presence of the band does not interfer with inspection of the inclinometer to obtain a reading.

Figure 6:
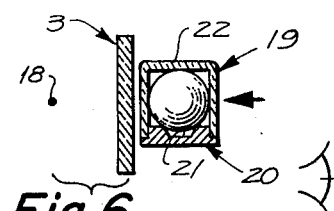
FIG. 6 is a fragmentary sectional view, in the same plane as FIG. 3, showing a modified form of the capsule which produces an indicator image in the form of a dot.

In some case, it is preferred to provide a small, relatively intensely illuminated dot or small circle, as indicated by 18. This may be accomplished, as indicated in FIG. 6, by a capsule 19, having a square passage therein rather than a circular passage. More specifically, the capsule 19 includes an arcuate base wall 20, preferably provided with a guide channel 21 to provide two-point contact with the ball. Positioned over the guide channel 21 is a cover 22, in the form of an inverted channel, having parallel side walls and an arcuate top wall. The base wall and cover may be formed of glass or plastic material and the two cemented together. Optically, the light received from the light source is focused by the ball to form a dot on the viewing plate 3. It will thus be seen that the circular walls of the capsule 7 distort the image produced by the ball into the diamond 15, which is known optically as a caustic image.

Figure 7:
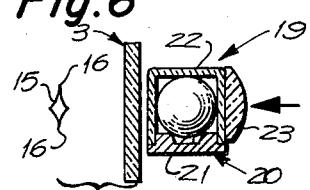
FIG. 7 is a sectional view, corresponding to FIG. 6, to which has been added a lens to convert the image into an attenuated diamond.
Figure 8:
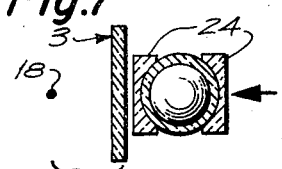
FIG. 8 is a sectional view of the construction shown in FIG. 3, to which has been added lenses to convert the indicator image into a dot.

If the capsule construction 19 is desired, and yet it is desired to retain the diamond or caustic image 15, an arcuate convex lens 23 may be provided at the light source side of the capsule 19, as shown in FIG. 7.

Alternatively, if it is desired to utilize the capsule 7 and yet produce a point or dot image 18, concave lenses 24 may be provided on opposite sides of the capsule 7.

Figure 9:
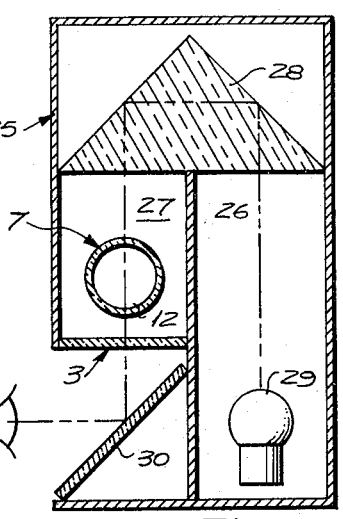
FIG. 9 is a substantially diagrammatic sectional view, taken in the same plane as FIG. 3, but showing a modified optical system.
Figure 10:
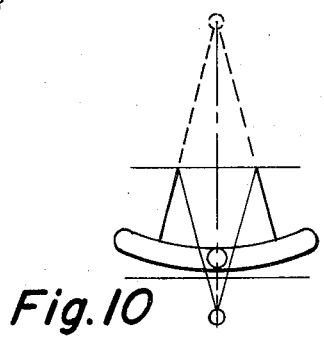
FIG. 10 is a diagrammatical view of the system shown in FIG. 9.

Reference is now directed to FIGS. 9 and 10. For some applications of the inclinometer, it may be desirable to direct the light vertically through the capsule 7. This may be accomplished by providing a housing 25, forming vertical parallel chambers 26 and 27, which are optically connected at their upper ends by a prism 28. At the bottom of the chamber 26 is a light source 29. The capsule 7 is disposed in the other chamber 27 with a viewing plate 3 and mirror 30 below. If the light source 29 is located optically at the image center of curvature of the capsule, as indicated in FIG. 10, no lenses are required.

Figure 11:
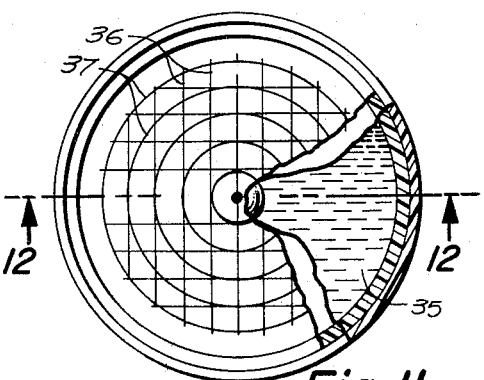
FIG. 11 is a top view of a modified form of the inclinometer, wherein the capsule utilizes plates of spherical contour.
Figure 12:
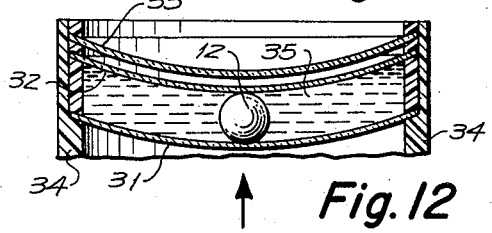
FIG. 12 is a fragmentary sectional view thereof, taken through 12—12 of FIG. 11.

Reference is now directed to FIGS. 11 and 12, which illustrate an embodiment of the inclinometer adapted to indicate inclination in any direction. This is accomplished by a lower plate 31 and an upper plate 32 of spherical contour and having the same center of curvature so that the plates are uniformly spaced to receive the ball 12 therebetween. Above the upper plate 32 is a correspondingly dished viewing plate 33, having a translucent side facing the plate 32, similar to the viewing face of the plate 3. All three plates are secured by their peripheries in a suitable mounting frame 34. The plates 31 and 32 form therebetween a capsule chamber filled with a damping liquid 35. The viewing plate 33 may be provided with a grid pattern 36, or a circular pattern 37, or both, as indicated in FIG. 11.

An image is produced on the viewing plate 33 from a light source, not shown, below the lower plate 31. The image, due to the focusing effect alone of the ball, appears as an illuminated dot 38. The outline of the ball itself also shows on the viewing plate as a shadow.

Should it be desirable to provide a downwardly pointing triangular image, the lower portion of the capsule 7 is masked; whereas, if an upwardly pointing triangular image is desired, the upper portion of the capsule is masked.

While the constructions described are referred to as inclinometers, they are also applicable as turn and bank indicators, wherein the active force is centrifugal force instead of gravitational force. The term "gravity" as herein used, includes any force such as centrifugal force which functions in the manner of gravitational force. Also, "upward" or "downward" is considered in relation to the axis of such force.

Glasses suitable for use as balls or rollers cover a very wide range of indices of refraction, from well below 1.5 to well above 1.8. These numbers approximately limit the range of interest for use in the bar-and-diamond type of image illustrated in FIG. 3. If the index of refraction of the ball or roller is appreciably below this range, a suitable liquid to match it cannot be found. If the index of refraction is appreciably above this range, the index of refraction of the liquid will be so high that the bar-and-diamond pattern will develop too close to the axis of the capsule to enable its imaging on the viewing surface.

In addition to glasses, transparent plastics have indices of refraction in the same range, but at the lower edge of the range. There are additional natural and synthetic crystals and fused materials, such as crystalline and fused quartz, and natural and synthetic sapphire and ruby which have indices of refraction in the usable range and which may be prepared in smooth spherical form and which can serve as suitable transparent balls or rollers of optical quality for the purposes of this invention.

The liquid to be used with the transparent ball should have an index of refraction approximately 0.2 units lower than that of the ball to produce an image that has approximately equal light intensities in the diamond-shaped pointer and in the bar or band which images the tubular capsule. This difference also produces sharp-edged images of the two forms (the bar and the diamond) at the same distance from the axis of the capsule. For example, a ball whose index of refraction is 1.5 can be made from laboratory-composition Pyrex glass. This can be matched optically by methyl alcohol or water, whose indices of refraction are approximately 1.33. Of the two, methyl alcohol is a little more suitable because its refractive index is a track lower. If the ball were of a transparent plastic and had this index of refraction, water would be preferential because of solvency, and the plastic would have to be of a class optically impervious to water, such as a member of the acrylic plastic family.

If the ball were to have a somewhat higher index of refraction, say 1.6, it could be matched by an aqueous solution of a very soluble alkali metal halide, compounded to have an index of refraction of 1.4, or by an extremely broad range of organic compounds and mixtures of organic compounds. Non-halogenated examples are n-Octane and n-Butyl Alcohol. An example of a mixture containing a halo-genated compound would be a mixture of Isopropyl ether and Carbon Tetrachloride, compounded to an index of refraction of 1.4. A plastic ball would essentially be limited to aqueous solutions because of solvency, and this could force an inversion of the ball level to one that is concave downward, with the ball riding at the top of the tube, like a bubble. A suitable plastic, such as Polystyrene, could have a lower density than the liquid. A suitable glass for a 1.6 index of refraction would be a light barium flint or crownglass, well known in the optical field. The density of such a glass ball would be near 3.5, considerably higher than that of any matching liquid, and there would be no problem of solvency from organic liquids.

A ball of 1.7 index of refraction would be exemplified by a very dense flint glass, suitable for use with organic liquids. A matching liquid could be compounded from a pair of halogenated liquids such as Carbon Tetrachloride and Perchloroethylene, to attain an index of refraction a little under 1.5. The glass would have a density near 4.3, considerably higher than that of the liquid, whose density would be near 1.6.

A ball of synthetic sapphire has an index of refraction of 1.77 and a density of almost 4.0. A matching liquid may be compounded from such liquids as Bromoform and Absolute Ethyl Alcohol, to an index of refraction near 1.55, which has the additional interesting and useful property of possessing a slightly higher density than that of Pyrex laboratory glass. This enables removal of fine particles of Pyrex from the lower contact region between the ball and capsule, by flotation. Pyrex contamination is quite common as a result of the glass-blowing operation that seals the ball into the capsule. The alcohol also has the useful property in this mixture of improving the stability of the Bromoform.

Figure 5:
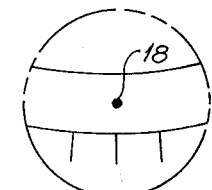
FIG. 5 is an enlarged fragmentary front view, similar to FIG. 4, but showing the indicator image in the form of a small dot.

Turning to the point or dot image illustrated by FIGS. 5 and 11, the optical requirements are less stringent than for matching the ball and liquid to produce the bar-and-diamond image. In the case of the dot or point image, the factors in balance are the ratio of indices of refraction of the ball and liquid, and the distance between the ball and the viewing surface. For a distance between the ball and viewing surface of approximately 25 percent of the ball radius, the ratio: index of refraction of the ball/index of refraction of the liquid can be near 1.4. If the distance is to be approximately the same as the ball radius, the ratio of indices can be near 1.3. Example materials can be taken from the previous cases, or from the technical handbooks.

An interesting and quite attractive property of the ball and liquid combinations is the opportunity of coloring the images by use of suitable colored or dyed liquids and balls. For example, a synthetic ruby ball (ruby is a special form of the aluminum oxide known in the art as sapphire, even though sapphire in common usage refers to the bluish natural or synthetic material) in a water-white Bromoform and Alcohol mix of 1.55 index of refraction will produce an image of ruby-red for the diamond-shaped pointer, with the bar image color being the same as that of the light source. If the liquid is dyed, the bar will be colored accordingly, and the diamond image of the ball will be tinted with the same color. For example, a slightly acidified Methyl Alcohol can be dyed with Methyl Red to produce an attractive red hue for the bar. The diamond in this case is tinted the same color, although much less intensely, if a water-white glass ball is used. Other examples and colors will be well known to those skilled in the art, as well as use of suitable color filters to achieve further colored effects by adjusting the color of the light used to produce the image. This type of effect is desirable for some forms of the inclinometer, as in the case of submarine or aircraft illumination, when night-vision is to be retained by the personnel using the instrument.

A further point needs to be mentioned with respect to the liquids suitable for the purposes of this invention. This is with respect to viscosity. The speed of ball response is sensitive to liquid viscosity, and the viscosity should be kept as low as feasible for reasonably prompt instrumental response. At the high end of the index of refraction scale, an example of a quite satisfactory liquid from this view-point is Bromoform. At the low end, the lower alcohols and water are quite satisfactory. Many other examples will be familiar to persons skilled in the art.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. An inclinometer, comprising:
   a. a sealed capsule including uniformly spaced opposed arcuate walls;
   b. a gravity responsive roller movable between the arcuate walls;
   c. a damping liquid filling the capsule;
   d. a light source at one side of the capsule;
   e. a window at the opposite side of the capsule, having an image reproducing surface;
   f. the roller, the walls of the capsule between the light source and the window, and the damping liquid being formed of light transmitting materials, and the roller tending to concentrate the light passing therethrough into an image of reduced dimension.

2. An inclinometer, as defined in claim 1, wherein:
   a. the optical properties of the tube, liquid and roller combine to produce an essentially diamond shaped image having opposed pointer apices.

3. An inclinometer, as defined in claim 1, wherein:
   a. the optical properties of the tube, liquid and roller combine to produce an essentially circular illuminated dot of small dimension.

4. An inclinometer, as defined in claim 1, wherein:
   a. the roller is spherical;
   b. and the capsule is an arcuate tube of circular cross section.

5. An inclinometer, as defined in claim 1, wherein:
   a. the roller is spherical;
   b. and the capsule includes a pair of dished members of spherical contour and defining a common center.

6. An inclinometer, as defined in claim 1, wherein:
   a. the capsule is essentially square in cross section;
   b. and the capsule wall of greater radial dimension having a roller guide track.

7. An inclinometer, as defined in claim 1, wherein:
   a. a lens confronts at least one light transmitting side of the capsule to alter the image produced on the window surface.

8. An inclinometer, as defined in claim 1, wherein:

a. the light passing from the source to the window passes perpendicularly to the planes defined by the arcuate sides.

9. An inclinometer, as defined in claim 1, wherein:

a. the light passing from the source to he window passes parallel to the planes defined by the arcuate sides.

10. An inclinometer, as defined in claim 1, wherein:

a. the density of the liquid is greater than the density of the material comprising the capsule walls.

11. An inclinometer, as defined in claim 1, a. the roller has an index of refraction between 1.5 and 1.8;

b. and the liquid has an index of refraction essentially 0.2 lower than the density of the roller.

12. An inclinometer, comprising:

a. an arcuate sealed tubular capsule having light transmitting walls curving upwardly in opposite directions from an intermediate point;

b. a light transmitting ball movable by gravity in the capsule;

c. and an optical system including a light source at one side of the capsule distributed along its length to transmit light through the ball irrespective of its position in the capsule, and an image reproducing means at the other side of the capsule;

d. the ball forming a condensing element of the optical system to produce an intensified image of reduced dimension in comparison to the diameter of the ball.

13. An inclinometer, as defined in claim 12, wherein:

a. optical means supplements the optical properties of the ball to produce a diamond shaped image having opposed attenuated apices.

14. An inclinometer, as defined in claim 12, wherein:

a. optical means supplements the optical properties of the ball to produce a circular image.

15. An inclinometer, comprising:

a. a dished sealed tubular capsule having a pair of uniformly spaced light transmitting walls of spherical contour, curving upwardly in radial directions from a center point;

b. a light transmitting ball movable by gravity in the capsule;

c. and an optical system including a light source at the convex side of the capsule, and a dished image reproducing means concentric with the concave side of the capsule;

d. the ball forming a condensing element of the optical system to produce an intensified and reduced image of the ball.

* * * * *